United States Patent

Petrucci

[11] 4,018,675
[45] Apr. 19, 1977

[54] WASTE SORTING MACHINE

[76] Inventor: Ben G. Petrucci, 6781 13th St., Sacramento, Calif. 95831

[22] Filed: May 19, 1975

[21] Appl. No.: 578,611

[52] U.S. Cl. .................................. 209/86; 209/295
[51] Int. Cl.$^2$ .......................................... B07C 1/10
[58] Field of Search .......... 209/294, 295, 296, 297, 209/298, 299, 95, 86

[56] References Cited

UNITED STATES PATENTS

| 259,160 | 6/1882 | Ingraham | 209/295 |
|---|---|---|---|
| 1,613,553 | 1/1927 | Arthur | 209/294 X |
| 1,930,952 | 10/1933 | Green | 209/295 X |
| 3,233,836 | 2/1966 | Merger | 209/299 X |

*Primary Examiner*—Allen N. Knowles

[57] ABSTRACT

A hexagonal-in-section trommel is rotatably mounted on a frame with the axis of rotation inclined downwardly from a waste material input end to a discharge end. The walls of the trommel include panels formed of screens having various predetermined mesh sizes, some relatively large, others relatively small.

Inwardly projecting rods mounted on the interior walls of the trommel are spaced apart in such a way that larger pieces (such as old corrugated paper board, or cardboard, long strips of paper and plastic sheets) are engaged by the rods and are lifted up the side walls of the trommel, thereby allowing smaller pieces of waste material not lifted by the rods to pass downwardly through the screen mesh for removal by a subjacent conveyor.

Concurrently, as the larger pieces approach the top of the trommel, they are disengaged from the rods by gravity; and as the larger pieces fall toward the bottom of the trommel, they concurrently move toward the discharge end owing to the trommel's inclination.

As the corrugated board, long strips of paper and plastic sheets fall toward the bottom of the trommel, the heavier, more compact, corrugated board with rigid sharp corners tends to force any underlying light flexible plastic sheets or paper strips downwardly against the screen and poke them through the wider meshes for removal by the subjacent conveyor.

Any pieces of light plastic or paper which might still be intermingled with the corrugated board at the discharge end of the trommel are removed by an air blast.

Thus, both small, undersized particles and large, yet light, pieces of paper and plastic are efficiently separated from the desired panels and flattened cartons of old corrugated board.

5 Claims, 9 Drawing Figures

WASTE SORTING MACHINE

BACKGROUND OF THE INVENTION

At present, old corrugated paper board, or card board, is the most valuable fraction to be recovered from solid waste material which also includes plastic and paper sheets and strips, bottles, cans, metal straps, wood, tires and the like, as well as sand, rocks, dust, dirt and other debris.

It is estimated that in the United States alone, up to 250 million tons of solid wastes are generated each year.

Interest is growing in the beneficial handling of these vast quantities of material owing to the fact that various fractions are often susceptible of being reused or recycled, with a resultant conservation of energy, natural resources and reduction in the amount of refuse to be buried or wastefully burned.

The technology of large scale solid waste classification and sorting is advancing; and the patent literature is not without representative systems, exemplary being the disclosures in U.S. Pat. No. 2,151,894, for Apparatus For Sorting Household Rubbish, granted Mar. 28, 1939, to Cambessedes and U.S. Pat. No. 2,307,059, for Apparatus For Separating Garbage, granted Jan. 5, 1943, to Moore.

Despite the foregoing disclosures and the existence of various solid waste sorting installations in numerous locations, both here and abroad, there remains considerable room for improvement, owing in part to the fact that the latter years have witnessed the proliferation of both light gauge plastic sheeting, used for a myriad of purposes, and lengthy strips of paper, such as the long strips carrying computer readouts. These lighter materials have heretofore been especially difficult to separate from corrugated paper board.

SUMMARY OF THE INVENTION

The invention relates generally to a system of sorting solid waste materials; and more particularly, to a waste sorting machine which recovers corrugated paper board panels and flattened cartons in such condition that the yield is relatively uncontaminated by other material and thus can be baled without any need for further separation.

It is an object of the invention to provide a waste sorting machine which is capable of receiving and handling a broad spectrum of solid waste materials.

It is another object of the invention to provide a waste sorting machine which efficiently separates light gauge plastic sheets and paper strips from corrugated paper board panels and flattened cartons.

It is still another object of the invention to provide a waste sorting machine which does not require comminution of the inflowing waste material in order to effect separation.

It is a further object of the invention to provide a waste sorting machine which is not only relatively economical to make and install, but which also is reasonable to operate.

It is still a further object of the invention to provide a waste sorting machine which requires but a minimum of people for its operation.

It is yet a further object of the invention to provide a waste sorting machine which is rugged and which, despite its relatively large size, has but few moving parts to get out of order and thus is relatively maintenance-free.

It is another object of the invention to provide a generally improved waste sorting machine.

Other objects, together with the foregoing, are attained in the embodiment described in the following description and illustrated in the accompanying drawings in which the following figures appear.

DETAILED DESCRIPTION OF PREFERRED EMBODIENT

While the waste sorting machine of the invention is susceptible of numerous physical embodiments, depending upon the environment and requirements of use, a machine similar to the herein shown and described embodiment has been made, tested and used, and has operated in an eminently satisfactory manner.

The waste sorting machine of the invention, generally designated by the reference numeral 11, broadly includes a waste input structure 12, comprising one or more consecutive feed conveyors 13 and 14, a waste separating structure 21, including a rotatable, inclined, hexagonal trommel 22, and a recovered waste discharge, or product collecting, structure 26.

The feed conveyors 13 and 14 are conventional, the first conveyor is being, for example, a "Mayfram" conveyor capable of lifting and transporting waste dumped in a pit 16, or hopper, the top of which is flush with the floor 17. In other words, as a dump truck, fork lift or other carrier approaches the pit with a load of waste, it can stop at a suitably located safety barrier adjacent the pit and discharge the load directly into the pit.

The conveyor 13 transverse to the orientation of the trommel 22, lifts the waste from the pit 16 and transports the waste on an endless upwardly inclined belt 18. From the belt 18, the waste outfall is carried by the second conveyor 14 through the trommel mouth 19 into the upper, input end 23 of the trommel 22. In passing through the forwardly and downwardly inclined trommel toward the lower, discharge end 24 thereof, waste separation occurs. The desired separation product, upon emerging from the output end 24, is carried away by a conveyor 30.

The unwanted small articles, such as dust, clods, bottles, cans and the like promptly pass downwardly through the screen mesh walls, generally designated by the reference numeral 27, and descend to the upper run of a counterflow conveyor 28 which removes the small articles from the trommel area as quickly as they are separated from the large items.

The conveyors 13, 14, 28 and 30 are of conventional construction and operation and are therefore neither shown nor described in detail.

The trommel 22, however, which is the core of the present invention, affords a number of features rendering it uniquely capable of separating old corrugated board from large sheets of thin gauge plastic material and long strips of computer readout paper, for example.

The trommel 22 is preferably polygonal rather than circular in cross-section, and in its preferred embodiment the trommel is hexagonal in section. The angles, or corners, of a polygon tend to prevent the waste material from sliding down the side walls as the trommel rotates about its longitudinal axis 29 such as often occurs where a trommel is circular in section. The successive corners and flats of a polygon, furthermore, continously interrupt and change the direction of flow of the waste material and thereby assist in the separation of the constituent articles by size, shape, aerodynamic and other properties possessed by each category of waste material.

Each of the trommel's six sides 31, 32, 33, 34, 35 and 36 (see FIG. 9) comprises four rows 37, 38, 39 and 40, or tiers, of screen mesh walls, forming a total of twenty four rectangular panels. For convenience each panel can be identified in FIG. 9 by rectangular coordinates. Thus, the upper right-hand corner panel, located on side 31 in tier 37 can be characterized by the numeric combination (31, 37); and the panel at the lower, left-hand corner, for example, is identified as (36, 40).

Each of the panels comprises, in addition to the screen mesh, a rectangular framework including a spaced pair of longitudinal angle iron stringers 41 and 42 and a spaced pair of transverse angle iron headers 45 and 55.

Figure 3:
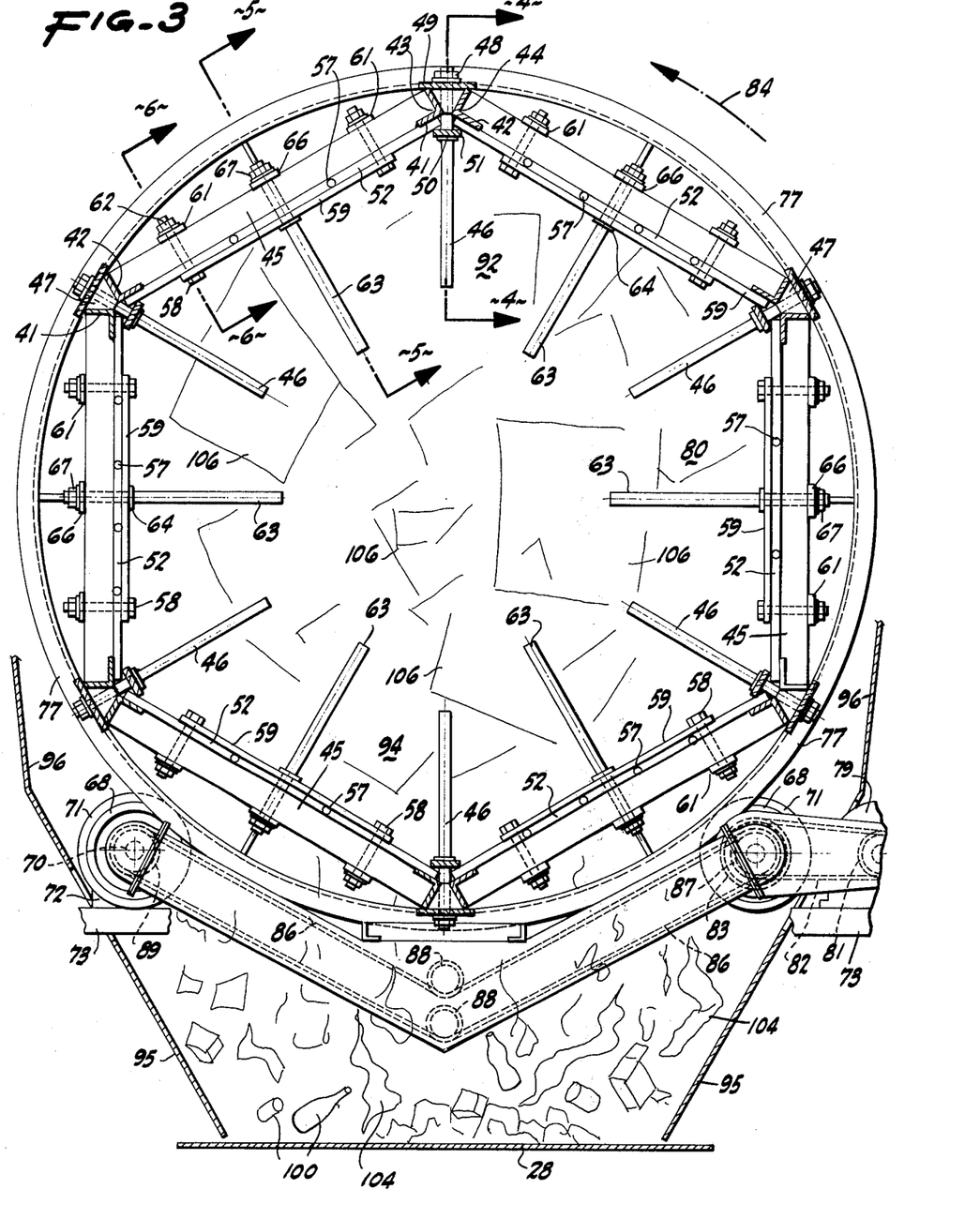
FIG. 3 is a fragmentary cross-sectional view of the trommel, the plane of the section being indicated by the line 3—3 in FIG. 2.
Figures 4, 5, 6, 7:
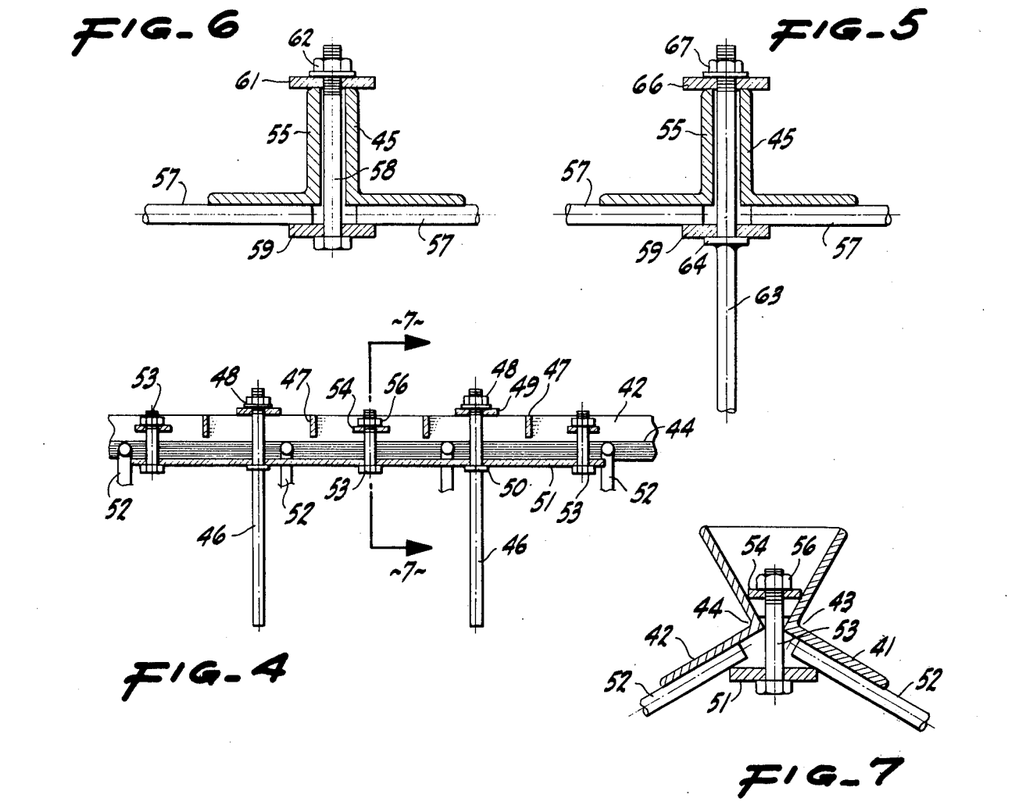
FIG. 4 is a fragmentary cross-sectional view of the corner rod and screen clamp construction, the plane of the section being indicated by the line 4—4 in FIG. 3.
FIG. 5 is a fragmentary cross-sectional view to an enlarged scale of a side rod and screen clamp construction, the plane of the section being indicated by the line 5—5 in FIG. 3.
FIG. 6 is a fragmentary sectional view, to an enlarged scale, of a screen clamp construction, the plane of the section being indicated by the line 6—6 in FIG. 3.
FIG. 7 is a fragmentary sectional view, to an enlarged scale, of a stringer joint and screen clamp construction, the plane of the section being indicated by the line 7—7 in FIG. 4.

As appears most clearly in FIG. 3–7, the adjacent angle iron stringers 41 and 42 in adjacent panels are oriented in a corner to corner relationship, with the corners 43 and 44, in FIGS. 3 and 4, for example, spaced apart a distance equal to the diameter of an interposed rod 46 projecting "radially" inwardly toward the trommel axis 29. Similar constructions are found at each of the six corners of the hexagon with two such corner rods 46 in each of the tiers 37, 38 and 39 and one such corner rod 46 in tier 40 (see FIG. 9) for a total of seven rods along each corner, or forty two rods overall.

A triangular in section gusset 47 spans the adjacent flaring walls of each of the stringers 41 and 42 and is welded thereto so as to hold the stringers securely together.

The outer end of the rod 46 is threaded and a nut 48 in engagement with the threads can be tightened so as to urge a clamping plate 49 against the outer edges of the sringers 41 and 42 and thereby firmly anchor the outer end of the rod 46.

The inner end of the rod 46 is anchored by a collar 50 welded to the rod. The collar 50 bears against a longitudinal strap 51 bearing against the interposed ends of the transversely oriented cross bars 52 of the mesh screen. As the nut 48 is tightened, the collar 50 and strap 51 not only securely clamp the ends of the cross bars 52 but also firmly position the rod 46.

Serving further to secure the adjacent longitudinal stringers 41 and 42 is a plurality of bolts (see FIGS. 4 and 7) passing through openings in the longitudinal strap 51, between the corners 43 and 44 and through openings in respective square washers 54 lodged in the flared space between the stringers 41 and 42, the bolts 53 being secured by nuts 56. As is shown most clearly in FIGS. 3, 6 and 9, the adjacent transverse headers 45 and 55 located between adjacent tiers of panels are utilized as supports for clamping the ends of the respective longitudinal bars 57 of the screen. A bolt 58 passing through an opening in a transverse strap 59 extends through the space separating the parallel flanges of the adjacent angle irons 45 and 55. The threaded end of the bolt 58 then protrudes through an opening in a washer 61 spanning the ends of the angle iron parrallel flanges and is secured by a nut 62. By tightening the nut 62, the longitudinal bars 57 of the mesh screen are tightly clamped between the transverse strap 59 and the aligned flanges of the adjacent headers 45 and 55 (see FIG. 6).

The strap 59 is also utilized as an anchor for a rod 63 which is similar to the rod 46 previously described except for location. In other words, the rods 46 are located at the angles or corners of the hexagon whereas the rods 63 are located centrally of the sides of the hexagon, as appears in FIG. 3. The rod 63 includes a collar 64 which bears against the strap 59. The rod 63 extends through the space between the adjacent flanges of the angle irons 45 and 55 (see FIG. 5) and includes a threaded end which passes through an opening in a washer 66 and is secured by a nut 67. As can be seen most clearly in FIG. 9 there are three such side rods 63 located in each of the six rows of panels for a total of eighteen side rods 63. The eighteen side rods 63 are staggered relative to the 42 corner rods 46. Owing to the geometry of the hexagon, even though the rods 46 and 63 are of the same length, the side rods 63 project inwardly toward the center farther than the corner rods 46. The two types of rods are therefore not only staggered in an axial sense but also in a radial, or polar fashion, thereby attacking the corrugated board and paper and plastic articles in a random pattern which continuously buffets them from different quarters.

Figure 1:
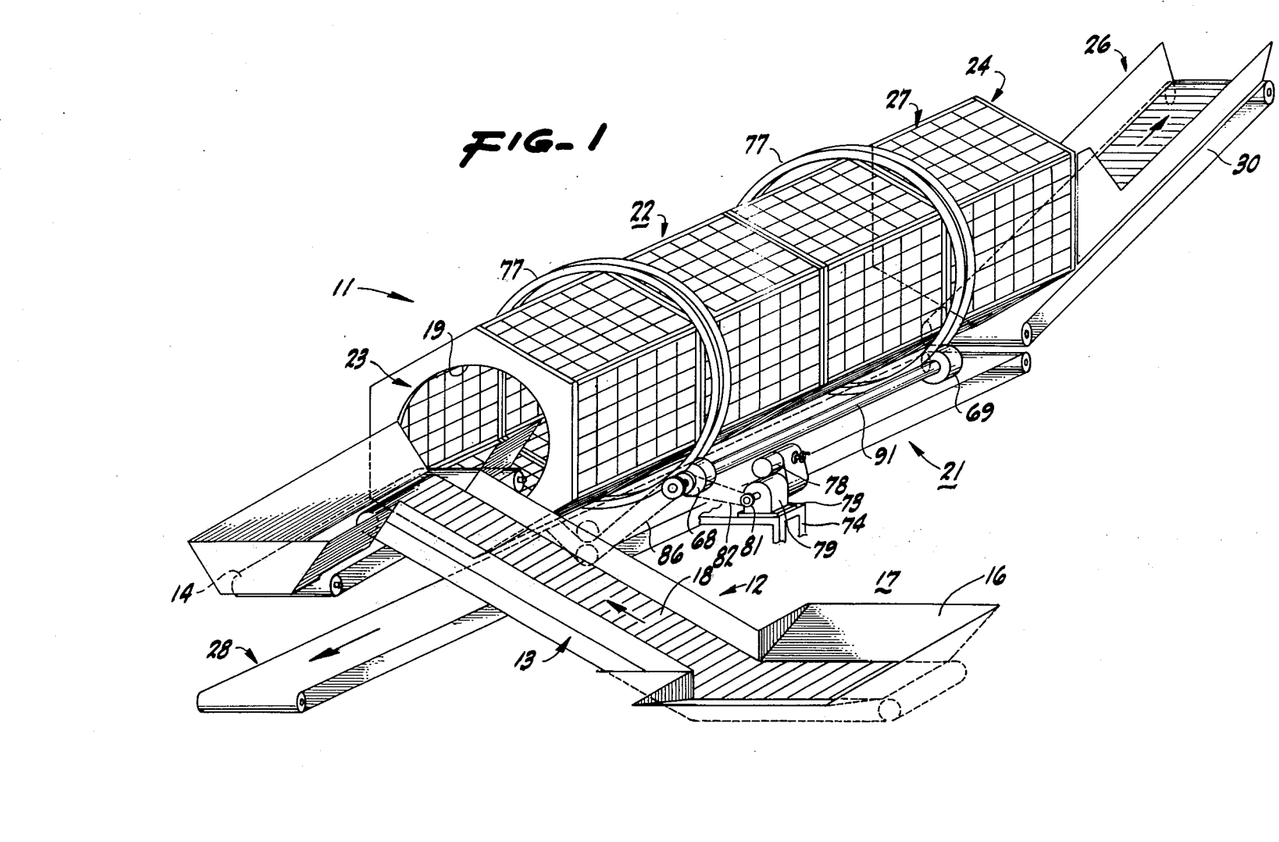
FIG. 1 is a fragmentary perspective view of a waste sorting machine constructed pursuant to the invention, the skirt boards being removed to show the underlying structure.
Figure 2:
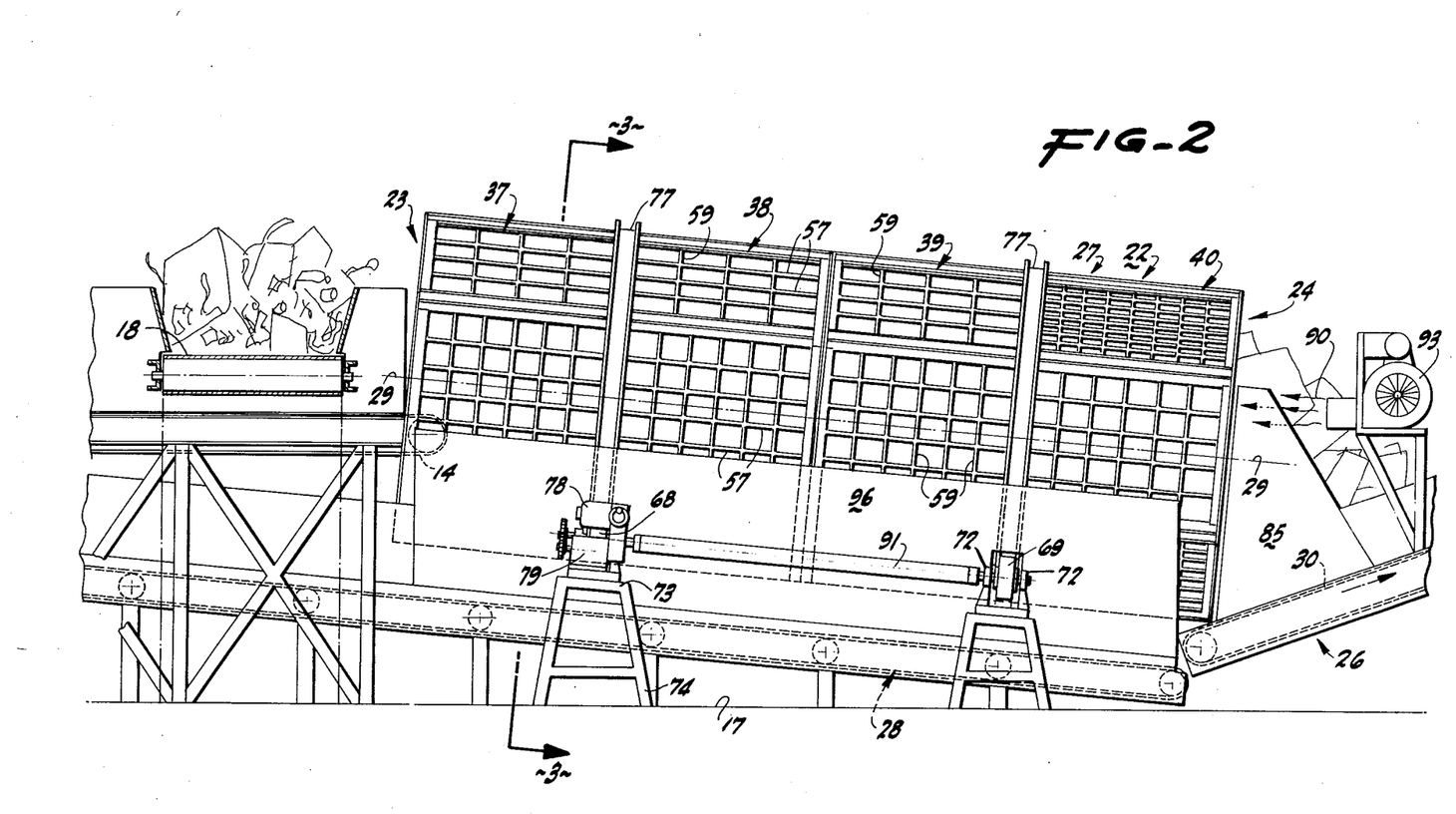
FIG. 2 is a fragmentary side elevational view.

The trommel 22 is journaled for rotation about its inclined longitudinal axis of 29 on two pairs of support rollers 68 and 69 (see FIGS. 1, 2 and 3). The upper pair 68 of rollers is substantially identical to the lower pair 69 and a description of one will therefore serve to describe the other.

The rollers 68 are covered by a resilient tread 71 and are mounted on shafts 70 journaled in bearings 72 carried on platforms 73 supported on frameworks 74 extending upwardly from the ground 17.

The rollers 68 rollingly engage a hoop-shaped circular track 77 encompassing the trommel 22 and mounted thereon. The track 77 is constructed of C-shaped channel bent into circular shape, with the channel web engaging the resilient tread 71. The flanges of the C-shaped channel are located on opposite sides of the rollers 68 and serve as centering guides.

Driving the rollers 68 is an electric motor 78 with a suitable transmission mechanism 79, a combination which affords variable speed capabilities. From the transmission 79 a drive sprocket 81 connected to a chain 82 rotates a driven sprocket 83 carried on the shaft 70 on which the adjacent one of the rollers 68 is coaxially mounted. A second chain 86 engages a sprocket 87 coaxially mounted on the shaft 70. The second chain 86 extends downwardly to a location below the longitudinal axis 29 of the trommel, passes over a pair of idler sprockets 88 thence upwardly to engage a second driven sprocket 89 coaxially mounted on the shaft 70 carrying the nether one of the rollers 68.

Serving to drive the proximal downstream one of the rollers 69 as shown in FIG. 1, is a torque tube 91. If desired, the nether one of the downstream rollers 69 can be driven, as before, by a suitable arrangement of sprockets and chains although this is not ordinarily considered nececessary.

In order to effect the desired separation of the various types of waste material carried from the conveyors 13 and 14 through the trommel mouth 19, the mesh sizes of the various screen panels are arranged in a predetermined fashion, as are the lengths and placement of the corner rods 46 and the side rods 63, as previously mentioned. So also, the speed of rotation of the trommel is regulated so as to provide the greatest efficiency and maximum yield of old corrugated board, it having been found, depending upon the nature and quantity of material being, that speeds on the order of 1.5 to 12.0 revolutions per minute provide an effective result. The speeds are determined from experience and are readily arrived at after some actual practice at different velocities under various load conditions.

Figure 9:
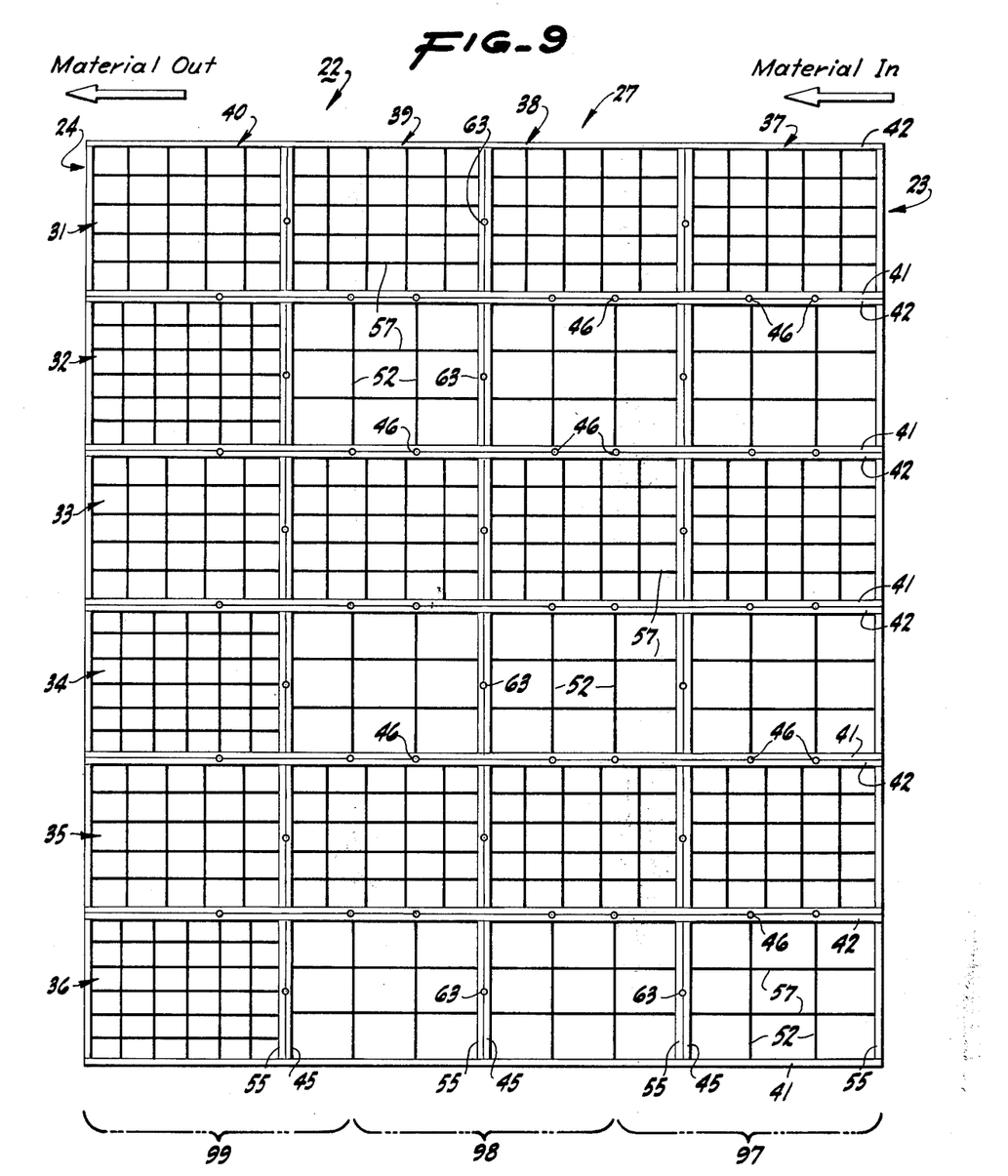

As appears most clearly in FIG. 9, which discloses a developed view of the trommel walls, the righ-hand side is the upper input end 23 and the left-hand side is the lower output end 24, or discharge end.

In the first tier 37, three of the screen panels, (32, 37) (34, 37) and (36, 37) are of largest mesh size, namely, on the order of 18 inches –20 inches by 18 inches –24 inches, or so. These three panels are effective to dispose of as much as 50% or more of the total mass of input material, such as bottles, cans, small pieces of wood and paper, clods, dirt etc. which fall through the "floor" portion 94 of the trommel and are directed by guide walls 95 downwardly onto the counterflow conveyor 28 which quickly removes the smaller material from the primary zone of separation 97 in the first tier 37 and at times a portion of the second tier 38. The precise dimensions of the largest mesh size are not critical, it having been found, for example that a square mesh size of approximately 18 inches on a side has worked very satisfactorily.

Interspersed between the specified three panels of largest size in the first tier 37 are three screen panels of intermediate mesh size, namely, on the order of 12 inches – 14 inches by 12 inches – 16 inches or so. As in the case of the relatively large mesh size, the precise dimensions are not critical. However, it has been found that with a mesh of approximately 18 inches for the large size, a mesh of about 12 inches provides a satisfactory result for the smaller, i.e., intermediate, size.

The secondary zone of separation 98 is effective to dispose of at least an additional 25% of the total mass of material; and the screen mesh pattern in tiers 38 and 39 is similar to that in tier 37, described above.

Tier 40, however, which makes up most of tertiary, and last, zone of separation 99, comprises alternate rows of intermediate size mesh, as set forth above, together with a small size mesh, on the order of 9 inches – 11 inches by 9 inches – 13 inches. By the time the material reaches the last zone of separation 99, substantially the only pieces remaining are the desired panels of old corrugated board and occasional long strips of unwanted paper and sheets of thin plastic which have managed to escape being separated in the primary zone 97 and the secondary zone 98.

As the materials approach the lower, output end 24 of the trommel, they are subjected to an upstream air blast 90 of considerable velocity emerging from a blower 93. The air blast 90, as shown in FIG. 2, is oriented in a counterflow direction and is effective to strip the light, flexible, aerodynamically responsive paper and plastic strips and sheets from the stiff, heavy, less responsive corrugated board and to blow the paper and plastic in a rearward, or upstream, direction, frequently back into the primary zone of separation 97 at which location it is again subjected to the forces which effect separation.

Assisting in the wind tunnel effect of the air blast 90 and serving to direct the emerging material onto the conveyor 30 is a guide panel 85. A pair of opposite guide panels 96, or skirt boards, merge downwardly into the guide walls 95 (see FIGS. 2 and 3) and thus also direct downwardly all material which emerges from the "side wall" portions 80 of the trommel as the trommel rotates in the direction indicated by the arrow 84 in FIG. 3.

For convenience, it can be considered that the floor portion 94 of the trommel covers the lowermost two panels as they appear in FIG. 3, covering a total of 120° of arc, whereas the side wall portions 80 are the two opposite vertical panels, each covering 60° of arc. The roof or ceiling portion 92 of the trommel comprises the two panels opposite the floor 94 and, similarly, extend over 120° of arc.

As will be recognized, the majority of the waste material entering the trommel falls by gravity onto the trommel floor 94 and there promptly pass through the various large mesh screens in the primary zone 97 of separation, as previously described.

The smaller articles are thereby quickly removed, leaving, for the most part, large articles including large panels of old corrugated board. Often, panels of double thickness are encountered, as would be the case where a carton constructed of corrugated board is flattened, as at a supermarket or at a furniture warehouse where the food or furniture articles, respectively, are shipped in such containers and are flattened after being emptied in order to save space. In addition to the rigid and sturdy panels of corrugated board, there are frequently large amounts of long strips of paper and plastic of light gauge. The paper and plastic are not ridid and because of their length and physical properties tend not only to wrap in rolls or balls as trommel rotation occurs but also to wind around portions of the corrugated board panels. The rigid panels do not change shape.

As rotation takes place, the rods 46, and 63 are swept across the trommel floor 94 into engagement with the stiff carton material and with the yielding paper and plastic located by gravity in the floor area 94.

Both the hard and the soft materials are carried up the right-hand side wall portion 80 (see FIG. 3). However, as the material begins to approach the roof area 92, the rods 46 and 63 are inclined downwardly and are not longer able to support the hard, rigid corrugated board material, as a reslut of which the boards fall off the rods and fall through a distance of ten or more feet, striking the floor area 94 with surprisingly great force.

Figure 8:
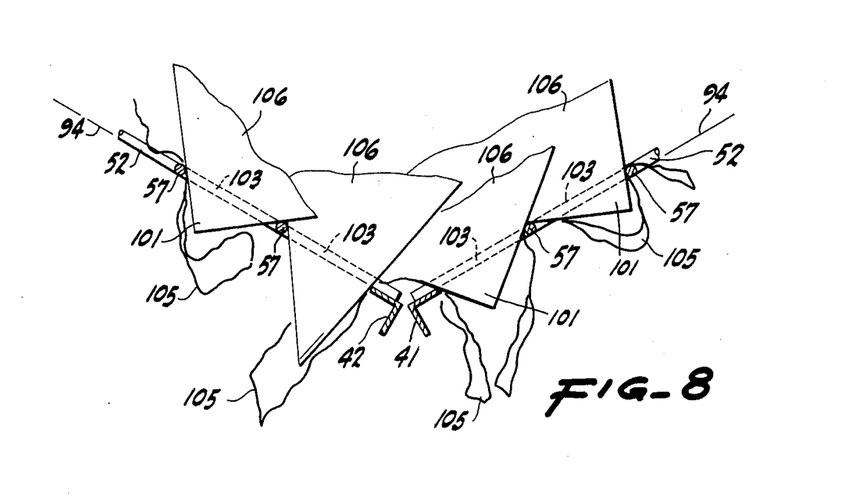
FIG. 8 is a fragmentary sectional view, to an enlarged scale, of a portion of the screen mesh illustrating the manner in which the corrugated board forces pieces of light paper or plastic through the screen openings; and, FIG. 9 is a developed view of the twenty four screen mesh panels.

Any paper or plastic located on the floor 94 are thereupon subject to a substantial impact, and where, as appears most clearly in FIG. 8, the square corners 101 or pointed tips 102 of a piece of corrugated board strike the paper or paper and penetrate the mesh openings 103 formed by the mesh bars 52 and 57, the paper and plastic are poked through the openings and are either pushed entirely through the openings onto the subjacent counterflow conveyor 28 or are temporarily lodged in the openings as the trommel continues to rotate. As the corrugated board panels are carried up the side wall 80, their weight dislodges them from the openings 103 and they again fall by gravity into the floor area 94. Repeated buffetings of the relatively hard board against the very pliable paper and plastic drive the latter through the openings 103, thereby affecting separation.

As will be noted, each time a piece of corrugated board is elevated into the roof area and then drops, it tends to move downstream, toward the discharge end, owing to the downward inclination of the trommel axis 29.

As previously indicated, any pieces of paper of plastic not previously separated by the time the output end is reached is returned toward the upstream end by the air blast 90.

In summary, the smaller debris 100 is promptly disposed of in the primary zone of separation, as indicated in FIGS. 2, 3 and 9, as well as a substantial fraction of the smaller paper and plastic pieces 104.

The larger pieces 105 of paper and plastic (see FIG. 8) are often not removed until repeatedly struck by the descending panels 106 of corrugated board arriving at different random angles of inclination and orientation. The repeated blows drive the pliable material through the mesh screen where they are removed.

Any remaining large pieces of paper and plastic are returned upstream by the air blast 90.

It can therefore be seen that I have provided a waste sorting machine which is capable of separating a wide variety of material into various wanted and unwanted fractions and, more particularly, of dividing out old corrugated board from the rest of the components, including long strips and sheets of pliable material such as paper and light gauge plastics.

What is claimed is:
1. A waste sorting machine comprising:
   a. a frame:
   b. an elongated, polygonal in cross-section trommel extending from an input end to an output end, the walls of said trommel being formed of screen having a predetermined mesh size incapable of supporting waste material smaller than said mesh size,
      1. each side of said polygonal in cross-section trommel including a plurality of panels covered by said screen and extending consecutively between said input end and said output end, said predetermined mesh size on at least some of said panels varying in dependence upon the distance from said input end and the side of said trommel on which said panel is located,
      2. at least some of said panels adjacent said input end carrying screen of relatively large mesh size and the remaining panels adjacent said input end carrying screen of relatively small mesh size,
      3. at least some of said panels adjacent said output end carrying screen of relatively large mesh size and the remaining panels adjacent said output end carrying screen of relatively small mesh size;
   c. means for mounting said trommel on said frame for rotation about the longitudinal axis of said trommel, said axis being inclined downwardly from said input end toward said output end in order gravitally to advance waste material entering said input end as said trommel is rotated, and to discharge through said output end material larger than said mesh size;
   d. means for rotating said trommel;
   e. a plurality of rods mounted on said trommel, said rods projecting into the interior of said trommel and being capable of engaging said material larger than said mesh size in the floor portion of said trommel and elevating the same as said trommel is rotated, said rods being incapable of supporting said material larger than mesh size when said rods approach an inverted position adjacent the ceiling portion of said trommel,
      1. said material larger than said relatively rigid including rectangular panels of relatively heavy and rigid corrugated board plus sheets of pliable light gauge material, and wherein said relatively large size mesh provides a plurality of openings through which a substantial portion of the corners of said rectangular panels can protrude as said material larger than said mesh size falls away from said rods when said rods approach said inverted position, said corners of said relatively rigid corrugated board panels being capable of engaging and poking subjacent ones of said pliable sheets downwardly through respective ones of said openings to a location outside said trommel while said relatiely ridgid corrugated board panels remain inside said trommel;
   f. conveyor means located adjacent said output end for carrying away said material larger than said mesh size advancing through said trommel and discharging through said output end; and,
   g. means below said trommel for removing said material smaller than said mesh size passing downwardly through said screen in the vicinity of said floor portion of said trommel.

2. A waste sorting machine as in claim 1 in which the dimensions of said relatively large mesh size are on the order of 18 inches – 20 inches by 18 inches – 24 inches and the dimensions of said relatively small mesh size are on the order of 12 inches – 14 inches by 12 inches – 16 inches.

3. A waste sorting machine as in claim 1 in which said trommel is hexagonal in cross-section, in which the dimensions of each of said panels are on the order of 5 feet 4 inches by 7 feet; in which there are 24 of said panels; in which the overall length of said trommel is on the order of 28 feet; and in which the outside cross-sectional dimension of said trommel is on the order of 11 feet 9 inches.

4. A waste sorting machine as in claim 1 in which said trommel rotating means includes an electric motor connected to said trommel; and means connected to said motor for varying the speed of said tormmel between 1.50 and 12.00 revolutions per minute.

5. A waste sorting machine as in claim 1 including a blower mounted on said frame adjacent said output end, said blower being oriented to blow air in an upstream direction, the air blast being effective to blow any remaining ones of said sheets of light gauge material adjacent said output end toward said input end, the air blast being ineffective to deter the downstream movement of said panels of relatively heavy corrugated board.

* * * * *